United States Patent [19]

Millspaugh

[11] 4,347,928
[45] Sep. 7, 1982

[54] MAGNETIC CONVEYOR
[75] Inventor: Russell E. Millspaugh, Downers Grove, Ill.
[73] Assignee: The Continental Group, Inc., New York, N.Y.
[21] Appl. No.: 869,769
[22] Filed: Jan. 16, 1978
[51] Int. Cl.³ .................... B65G 15/58; B65G 17/46
[52] U.S. Cl. .................................................. 198/690
[58] Field of Search ............... 198/690, 691, 439, 381, 198/607, 679; 209/907, 636

[56] References Cited
U.S. PATENT DOCUMENTS

| 3,120,891 | 2/1964 | Cmiel | 198/690 |
| 3,447,663 | 6/1969 | Sarovich | 198/690 X |
| 3,590,974 | 7/1971 | Loveless | 198/690 X |
| 3,666,083 | 5/1972 | Smith | 198/778 |
| 3,941,237 | 3/1976 | MacGregor | 198/690 X |

Primary Examiner—Robert B. Reeves
Assistant Examiner—Douglas D. Watts
Attorney, Agent, or Firm—Charles E. Brown

[57] ABSTRACT

A magnetic conveyor for transferring units, capable of being magnetized, from a first moving conveyor along a path to a second moving conveyor wherein the first and second conveyors are positioned at different elevations. The magnetic conveyor includes a conveyor element positioned relative to the first and second conveyors for carrying the units along the path therebetween, drive mechanism being connected to the conveyor element for imparting relative movement thereof, respective entrance and exit guides for transferring the units from the first conveyor to the conveyor element and therefrom to the second conveyor, and a magnetic support engagably underlying a portion of the conveyor element for providing support thereto and magnetically retaining units being conveyed along the path from the first conveyor to the second conveyor.

8 Claims, 4 Drawing Figures

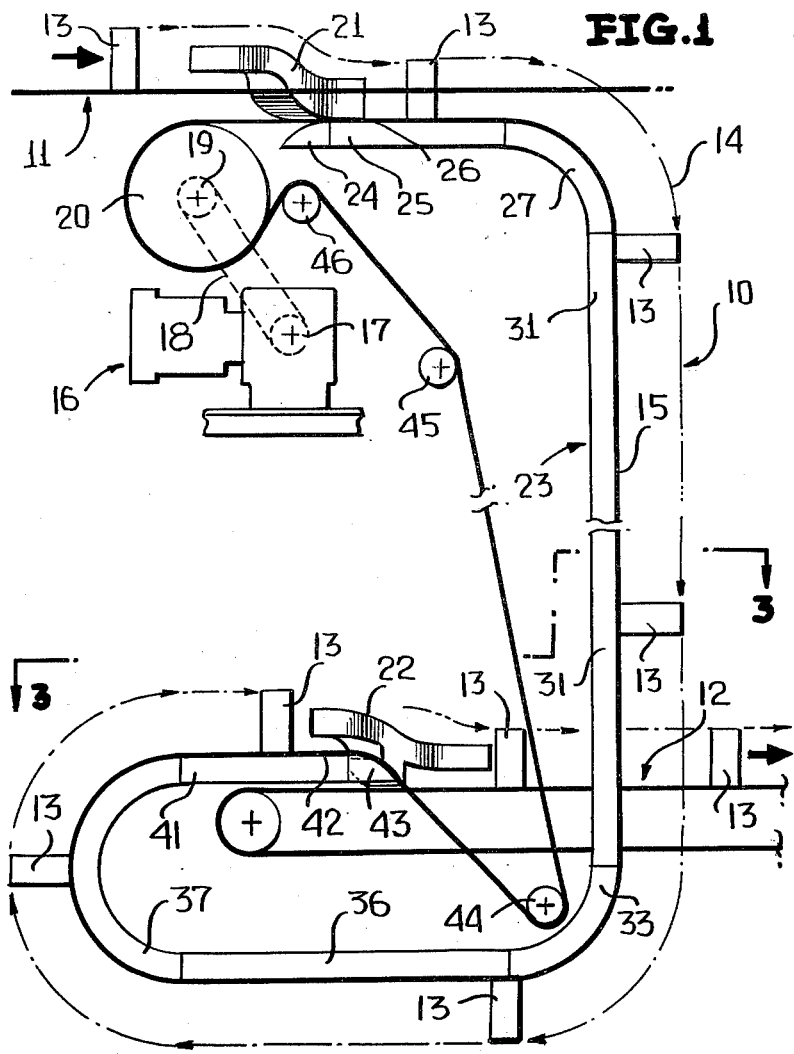
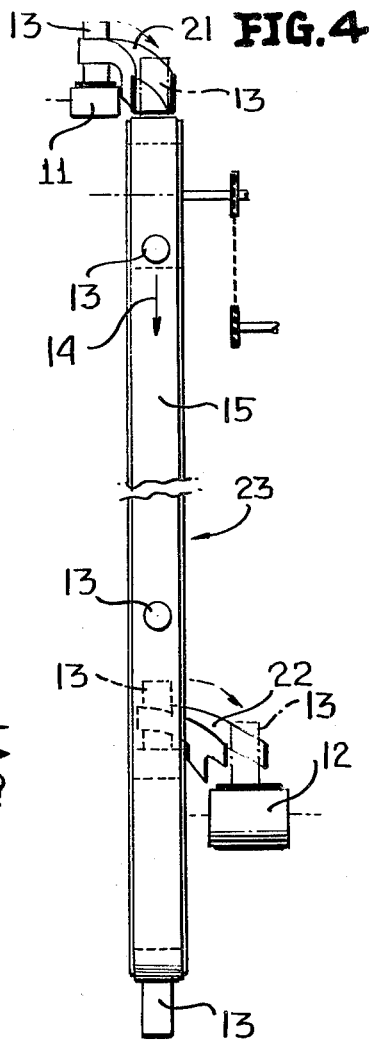
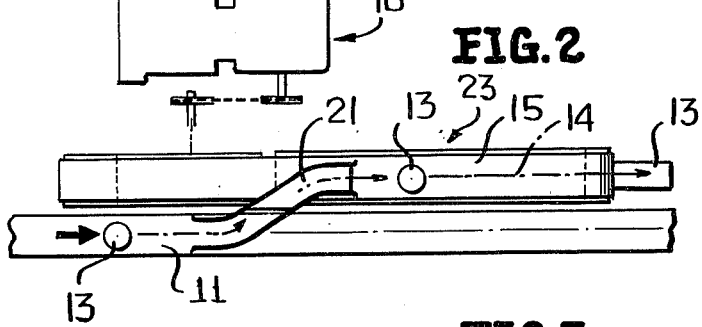
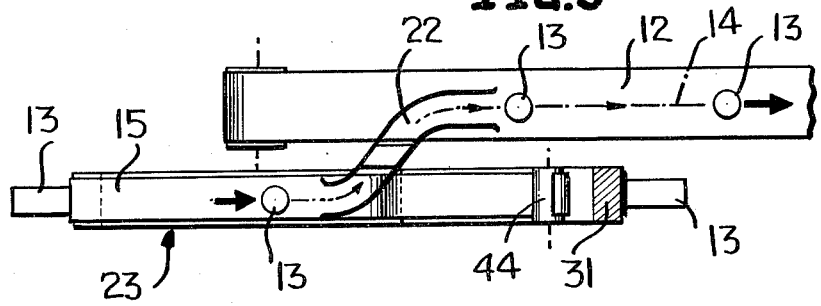

MAGNETIC CONVEYOR

This invention relates, in general, to conveyors employed to transfer units from one conveyor to another conveyor. One conveyor supplies the units, while the other conveyor carries the units to another station. Each conveyor is positioned at a different elevation, and therefore, the need has arisen for an additional conveyor which will transfer the units from one elevation to another elevation.

Several transfer conveyors have been utilized to bridge the elevation difference, but several problems have been associated with the transfer conveyors, which this invention tends to overcome.

In the past, magnetic drums have been utilized. However, the magnetic drums have many deficiencies which make the use of such transfer means in special circumstances not feasible, particularly when space is critical and transfer is being effected between two different elevations and the article being carried has a high center of gravity so that it is instable and easily tipable. First of all, in order to convey relatively tall cans, the magnetic drum must have a diameter on the order of at least 24 inches. This size, of course, is a controlling factor in the horizontal and vertical dimensions of the transfer conveyor.

Magnetic drums have at least two further deficiencies from an economic standpoint. First of all they are very expensive as compared to other types of conveyors. Secondly, and of equal importance, they are not readily available. At the present there is a waiting period on the order of several months.

It is an object of this invention to provide a magnetic conveyor which will span the elevation differences between two respective conveyors and carry tall filled cans without the use of magnetic drums.

It is another object of this invention to provide a magnetic conveyor which is compact, inexpensive and has magnetic force sufficient to securely attract units to the conveying means as the units are transfered from one conveyor to another conveyor at different elevations.

It is a further object of this invention to replace the costly magnetic drum with economical magnetic supports thereby providing magnetic arcuate and straight sections which magnetically influence and retain the units on a conveyor belt as they are conveyed.

With the above and other objects in view that will hereinafter appear, the nature of the invention will be more clearly understood by reference to the following detailed description, the appended claimed subject matter and the several views illustrated in the accompanying drawing.

IN THE DRAWING

FIG. 1 is a schematic side elevational view of a magnetic conveyor carrying units magnetically attracted thereto from a first conveyor at a first elevation, to a second conveyor at a second and different elevation.

FIG. 2 is a schematic top plan view of the conveyor arrangement of FIG. 1 and particularly shows the relationship of the first conveyor with respect to the magnetic conveyor.

FIG. 3 is a fragmentary sectional view, taken generally along line 3—3 of FIG. 1, and shows the relationship of the magnetic conveyor with respect to the second conveyor.

FIG. 4 is a schematic end elevational view of the conveyor arrangement of FIG. 1, and further shows the relationship of the first conveyor, the magnetic conveyor and the second conveyor.

A novel magnetic conveyor constructed in accordance with this invention is illustrated in FIG. 1 of the drawings, and is generally designated by the reference number 10. The magnetic conveyor 10 is positioned vertically between a first conveyor 11 and a second conveyor 12. The first conveyor 11 is positioned at a first elevation, while the second conveyor 12 is positioned at a second elevation lower than the elevation of the first conveyor 11.

A plurality of units 13 which are capable of being magnetized, tall filled can units having a height on the order of $6\frac{1}{4}$ inch and a diameter on the order of $2\frac{3}{4}$ inch, are moved along the first conveyor 11 and deposited upon the magnetic conveyor 10. The units 13 are magnetically secured to the magnetic conveyor 10 and are conveyed along a path, generally indicated by the dot-dash line 14, to the second conveyor 12. The units 13 are then deposited upon the second conveyor 12 which is a take away conveyor.

The magnetic conveyor 10 includes a conveyor means 15 which runs generally between the first conveyor 11 and the second conveyor 12. The conveyor means 15 is of the continuous type and is suitably designed to receive and transport units 13 from the first conveyor 11 to the second conveyor 12. The magnetic conveyor 10 further includes a suitable drive means 16, which is illustrated as being in the form of a motor-reduction gear unit, for imparting relative movement to the conveyor means 15.

The drive means 16 imparts movement to the conveyor means 15 by rotating a sprocket or pulley 17 which, in turn, drives a chain or belt 18. The chain or belt 18 drivingly engages a driven member 19 of a drum roller 20 which, when rotated, drives the conveyor means 15.

The magnetic conveyor 10 also includes an entrance guide or chute 21 which is positioned relative to the first conveyor 11 and the conveyor means 15 to receive units 13 from the first conveyor 11 and deposit the units 13 directly upon the conveyor means 15. An exit guide or chute 22 is positioned relative to the conveyor means 15 and the second conveyor 12 to receive units 13 from the conveyor means 15 and deposit the units 13 directly upon the second conveyor 12 by which the units 13 are taken away.

The magnetic conveyor 10, in addition to the above, includes a magnetic support means, generally identified by the numeral 23, which is positioned to engagably underlie that portion of the conveyor means 15 which extends between the conveyors 11 and 12. The support means 23 is positioned adjacent the entrance guide 21 and the exit guide 22 and generally follows the path as outlined by the dot-dash line 14. The support means 23 provides support for the conveyor means 15 which is moved thereover, and also provides support for the units 13 as they are conveyed along from the first conveyor 11 to the second conveyor 12.

The support means 23 exhibits a magnetic force which is sufficient to influence the units 13 deposited upon the conveyor means 15 and magnetically retain the units 13 thereon until each unit 13 is removed by the exit guide 22.

The support means 23 is constructed of a plurality of sections, which will be described in more detail hereinafter, the sections being interconnected to provide support for the portion of conveyor means 15 lying along the path 14. A first tip section 24 is positioned beneath the entrance guide 21, and is shaped to allow the conveyor means 15 to freely pass thereover. An entrance section 25 is connected to the first tip section 24, and has a portion disposed beneath the entrance guide 21 at a point 26. The entrance section 25 exhibits a magnetic force which will strongly attract the units 13 and magnetically retain the units 13 on the conveyor means 15 when deposited thereon by the entrance guide 21. The entrance section 25 may also be of any suitable length deemed necessary to insure that each unit 13 is positively magnetically retained on the conveyor means 15 for its travel along the path 14.

The support means 23 includes a first arcuate or curved section 27 which is connected to the entrance section 25. The first arcuate section 27 exhibits a magnetic force which is sufficient to magnetically retain each unit 13 on the conveyor means when moving around the relatively sharp curvature of the first arcuate section 27. The first arcuate section 27 has an arc on the order of 90°.

The support means 23 includes a first straight section 31 connected to the first arcuate section 27. The first straight section is positioned generally vertically and may be of any suitable length in order that the magnetic conveyor 10 may span to accommodate various elevational differences. The first straight section 31 also exhibits a magnetic force which is sufficient to magnetically retain each unit 13 on the conveyor means 15 when conveyed with respect to the first straight section 31.

The support means 23 includes a second arcuate or curved section 33 connected to the first straight section 31. The curved section 33 is in constant underlying engagement with the conveyor means 15 and exhibits a magnetic force which is sufficient to magnetically retain each unit 13 on the conveyor means 15 when moved around the relatively sharp second arcuate section 33. The second arcuate section 33 extends generally through an arch of 90°.

The support means 23 includes a second straight section 36 connected to the second arcuate section 33. The second straight section 36 is positioned generally parallel and at a lower elevation with respect to the second conveyor 12. The second straight section 36 exhibits a magnetic force which is sufficient to magnetically retain each unit 13 on the conveying means 15 when being conveyed beneath the second straight section 36.

The support means 23 includes a third arcuate or curved section 37 connected to the second straight section 36. The curved section 37 is in constant underlying engagement with the conveyor means 15 and exhibits a magnetic force which is sufficient to magnetically retain each unit 13 on the conveyor means 15 when conveyed around the relatively sharp third arcuate section 37. At this time it is pointed out that the curved sections 27 and 33 are preferably identical and the curved section 37 is preferably formed of two such 90° curved sections to have an arcuate extend of 180°. Each arcuate section may have a radius on the order of 12 inches or more. For example, cans taller than 6¼ inches could require a 16 inch radius for adequate control. The third arcuate section 37 is of sufficient arcuate extent to bring the conveyor means 15 generally parallel to and above the second conveyor 12.

The support means 23 includes a straight exit section 41 connected to the third arcuate section 37. The exit section 41 has a portion located beneath the exit guide 22, the portion being generally indicated at 42. The exit section 41 is positioned generally parallel with respect to the second conveyor 12. The exit section exhibits a magnetic force which is sufficient to magnetically retain each unit 13 when conveyed with respect to the exit section 41. The exit section 41 may also have a tapered field which provides a diminishing magnetic force thereby enabling the exit guide 22 to readily remove each unit 13 from the conveyor means 15.

The magnetic conveyor 10 further includes a second tip section 43 connected to the exit section 41. The second tip section 43 is also shaped to allow the conveyor means 15 to pass thereover and downwardly and to the right without any interruption as will be described in detail hereinafter.

In order that the magnetic conveyor 10 may be utilized to span various elevational differences from one location to another, idler guides or rollers 44, 45 and 46 may be positioned where deemed necessary in order to provide a smooth running conveyor system, and to take up any undesirable slack in the conveyor means 15. With this respect it is to be noted that the roller 44 is disposed to the right of and below the tip section 43.

The conveyor means 15 may be made of any suitable material which would not substantially effect the magnetic influence of the support means 23 upon the units 13. The conveyor means 15 may also be of a material which would possibly increase the magnetic influence of the support means 23 and is preferably in the form of a belt.

The support means 23, which exhibit a magnetic force, may be constructed of a suitable magnetic material. The support means 23 may be formed of readily available industrial magnets, or may be of an electromagnetic type.

The entrance and exit guides 21 and 22 are respectively each constructed from material which is not substantially influenced by the magnetic force of the support means 23. The particular material construction of the entrance and exit guides 21 and 22 allows the units 13 to move free along each respective guide.

Referring to FIG. 2, it will be seen that the first conveyor 11 conveys a unit 13 along the path 14 where units 13 are sequentially received by the entrance guide 21. The entrance guide 21 deposits the units 13 sequentially upon the conveyor means 15. Once a unit 13 is deposited upon the conveyor means 15, it is magnetically retained thereon by the magnetic support means 23. The drive means 16, which imparts relative movement to the conveyor means 15, causes the retained unit 13 to be moved by the conveyor means 15 along the path 14.

In FIG. 3 there is shown how a unit 13 being conveyed along the conveyor means 15 while being magnetically retained thereon by the magnetic support means 23 is sequentially received by the exit guide 22 and guidingly deposited upon the second conveyor means 12 which moves each unit 13 to an area further down the line (not illustrated).

Referring to FIG. 4, there is shown a unit 13 being conveyed along the first conveyor 11 received by the entrance guide 21 and guidingly deposited upon the conveyor means 15. After being conveyed along the path 14, each unit 13 is received by the exit guide 22 which guidingly deposits the unit 13 upon the second conveyor 12.

I am not aware of any structure having been previously used of the configuration herein disclosed, but I know that empty cans have been conveyed over a 90° radius from a forming machine to a discharge conveyor. Also, previously filled cans have been carried up an incline of 35° and over 65° radius to level.

It is to be understood that the magnetic conveyor 10 will include a suitable supporting frame which forms no part of this invention. The various components of the magnetic conveyor will be individually mounted on the frame in any suitable conventional manner.

The instant configuration carries a filled can through 360° turns which allows identical attitude at each elevation. Although only a preferred embodiment of the invention has been specifically illustrated and described herein, it is to be understood that minor variations may be made in the apparatus without departing from the spirit and scope of the invention, as defined in the appended claims.

I claim:

1. A magnetic conveyor for transferring units capable of being magnetized from a first conveyor along a path to a second conveyor wherein said first and second conveyors are positioned at different elevations, said magnetic conveyor comprising conveyor means adapted to be positioned relative to first and second conveyors for carrying units along said path, drive means connected to said conveyor means for imparting movement to said conveyor means, an entrance guide adapted to be positioned to receive units from a first conveyor and deposit the same units directly upon said conveyor means, an exit guide positioned to receive units from said conveyor means and direct the same units to a second conveyor, and support means positioned along said path and engageably underlying a portion of said conveyor means for providing support to said conveyor means portion, said support means exhibiting a magnetic force whereby the units deposited upon said conveyor means portion are magnetically retained on said magnetic conveyor while being transported to said exit guide, said support means being constructed of plural sections including an entrance section positioned directly adjacent said entrance guide, an exit section positioned directly adjacent said exit guide, and several interconnected arcuate sections disposed along the path between said entrance and exit sections, said exit section exhibiting a magnetic force of lesser degree than the magnetic force of the other of said support means sections, the lesser magnetic force of said exit section and the position of said exit guide defining means for facilitating units to be readily transferred from said magnetic conveyor to a second conveyor.

2. A magnetic conveyor for transferring units capable of being magnetized from a first conveyor along a path to a second conveyor wherein said first and second conveyors are positioned at different elevations, said magnetic conveyor comprising conveyor means adapted to be positioned relative to first and second conveyors for carrying units along said path, drive means connected to said conveyor means for imparting movement to said conveyor means, an entrance guide adapted to be positioned to receive units from a first conveyor and deposit the same units directly upon said conveyor means, an exit guide positioned to receive units from said conveyor means and direct the same units to a second conveyor, and support means positioned along said path and engageably underlying a portion of said conveyor means for providing support to said conveyor means portion, said support means exhibiting a magnetic force whereby the units deposited upon said conveyor means portion are magnetically retained on said magnetic conveyor while being transported to said exit guide, said conveyor means and support means lying in a single general plane and including vertically spaced parallel horizontal entrance and exit paths.

3. The magnetic conveyor of claim 2 wherein said entrance and exit paths extend in the same horizontal direction.

4. The magnetic conveyor of claim 3 wherein said conveyor means passes around curves of the same hand totalling 360° between said entrance and exit portions.

5. The magnetic conveyor of claim 2 wherein said conveyor means passes around curves of the same hand totalling 360° between said entrance and exit portions.

6. The magnetic conveyor of claim 2 wherein the horizontal direction of movement of said conveyor means is the same along both said entrance and exit paths.

7. The magnetic conveyor of claim 6 wherein said conveyor means passes around curves of the same hand totalling 360° between said entrance and exit portions.

8. The magnetic conveyor of claim 6 wherein said conveyor means moves upwardly towards said horizontal entrance paths and downwardly away from said horizontal exit paths.

* * * * *